(12) United States Patent
Arov

(10) Patent No.: US 7,631,632 B2
(45) Date of Patent: Dec. 15, 2009

(54) ORBITAL ENGINE/PUMP WITH MULTIPLE TOROIDAL CYLINDERS

(76) Inventor: Anatoly Arov, 195 Wynford Dirve, Apt. 1004, North York, Ontario (CA) M3C 3P3

( * ) Notice: Subject to any disclaimer, the term of this patent is extended or adjusted under 35 U.S.C. 154(b) by 0 days.

(21) Appl. No.: 10/579,462

(22) PCT Filed: Nov. 19, 2004

(86) PCT No.: PCT/CA2004/001989

§ 371 (c)(1),
(2), (4) Date: May 15, 2006

(87) PCT Pub. No.: WO2005/049969

PCT Pub. Date: Jun. 2, 2005

(65) Prior Publication Data

US 2007/0062482 A1    Mar. 22, 2007

(30) Foreign Application Priority Data

Nov. 21, 2003    (CA) .................................... 2450542

(51) Int. Cl.
| F02B 53/00 | (2006.01) |
| F01C 1/00 | (2006.01) |
| F01C 1/344 | (2006.01) |
| F04C 18/00 | (2006.01) |
| F04C 2/00 | (2006.01) |

(52) U.S. Cl. ........................ 123/241; 123/243; 123/245; 416/36; 74/437

(58) Field of Classification Search ................. 123/241, 123/243, 245; 418/35–38; 74/437
See application file for complete search history.

(56) References Cited

U.S. PATENT DOCUMENTS

| 3,061,180 A | 10/1962 | Durgin | .......................... 418/36 |
| 3,112,062 A * | 11/1963 | Way | .............................. 418/36 |

(Continued)

FOREIGN PATENT DOCUMENTS

CA    2077275 A    3/1994

(Continued)

*Primary Examiner*—Thai-Ba Trieu
(74) *Attorney, Agent, or Firm*—Elias Borges

(57) ABSTRACT

The orbital engine or pump comprising of drive train, having several elliptical gears each rotating around focal point with focal distance defined as function of minimum vanes opening, and toroidal cylinders each having inside two impellers with radial vanes continuously rotating with oscillation through a series of identical elliptical gears with one gear on each impeller shaft and second gears in mesh located on input/output shaft out of phase allowing synchronization of cycles performed in each chamber inside toroidal cylinders positioned planetary to input/output shaft. Some of the chambers could be selectively allocated to perform suction, compression, vacuum and combustion with air, gas, steam and liquid media through efficient internal rotary valves attached to impellers or housing and in most cases, eliminating the need for external valving.

5 Claims, 18 Drawing Sheets

U.S. PATENT DOCUMENTS

| | | | | |
|---|---|---|---|---|
| 3,169,487 A | * | 2/1965 | Takashi | 418/36 |
| 3,203,405 A | | 8/1965 | Sabet | 418/36 |
| 3,205,875 A | * | 9/1965 | Thomas et al. | 123/243 |
| 3,398,643 A | | 8/1968 | Schudt | 418/36 |
| 3,430,573 A | * | 3/1969 | Groeger | 418/36 |
| 3,476,056 A | * | 11/1969 | Bright | 418/36 |
| 3,730,654 A | | 5/1973 | McMahon | 418/36 |
| 3,797,237 A | * | 3/1974 | Kamiya | 123/239 |
| 4,068,985 A | | 1/1978 | Baer | 418/36 |
| 5,405,300 A | | 4/1995 | Sakita | 74/437 |
| 5,622,149 A | | 4/1997 | Wittry | 123/245 |
| 5,983,940 A | * | 11/1999 | Smith | 137/625.22 |
| 6,457,451 B1 | | 10/2002 | Sakita | 123/245 |
| 6,941,968 B2 | * | 9/2005 | Vidal | 137/544 |

FOREIGN PATENT DOCUMENTS

| | | |
|---|---|---|
| WO | WO 8606786 A1 * | 11/1986 |
| WO | WO 9517582 A1 * | 6/1995 |

* cited by examiner

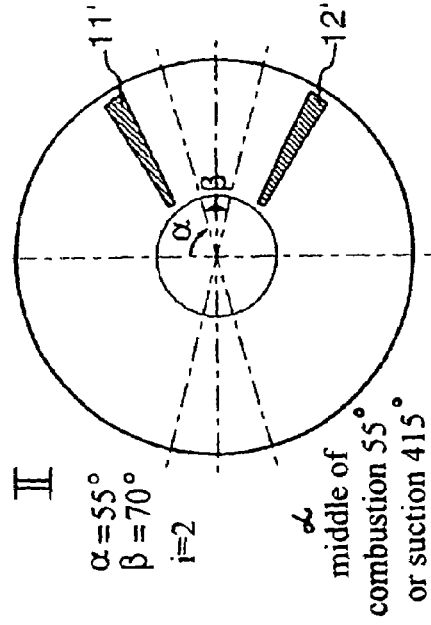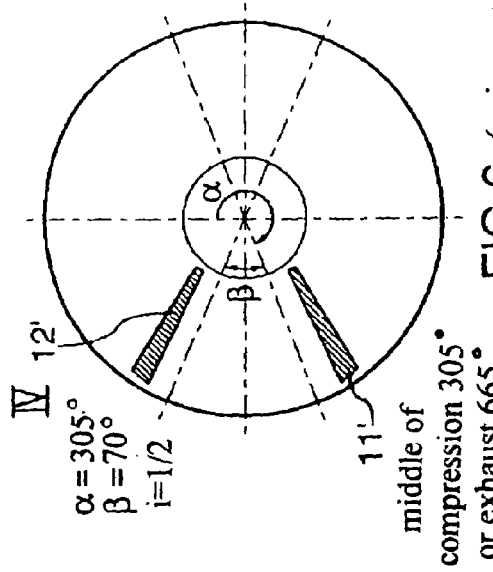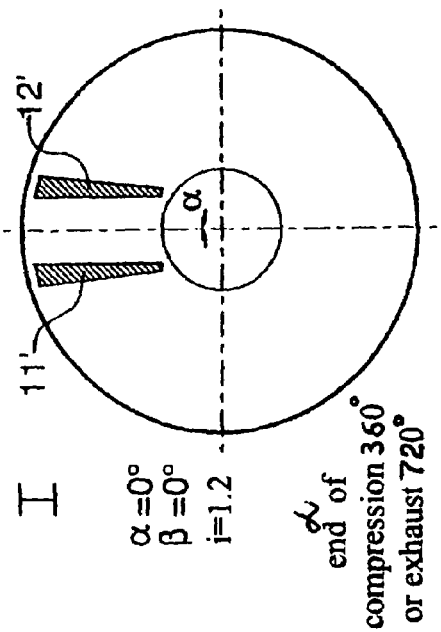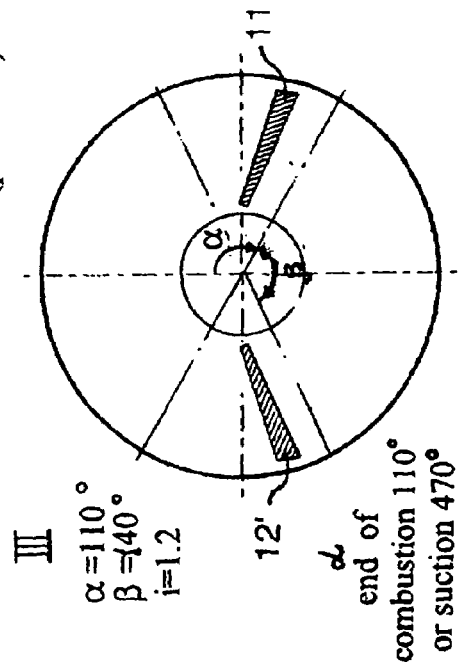

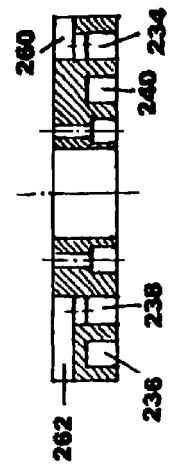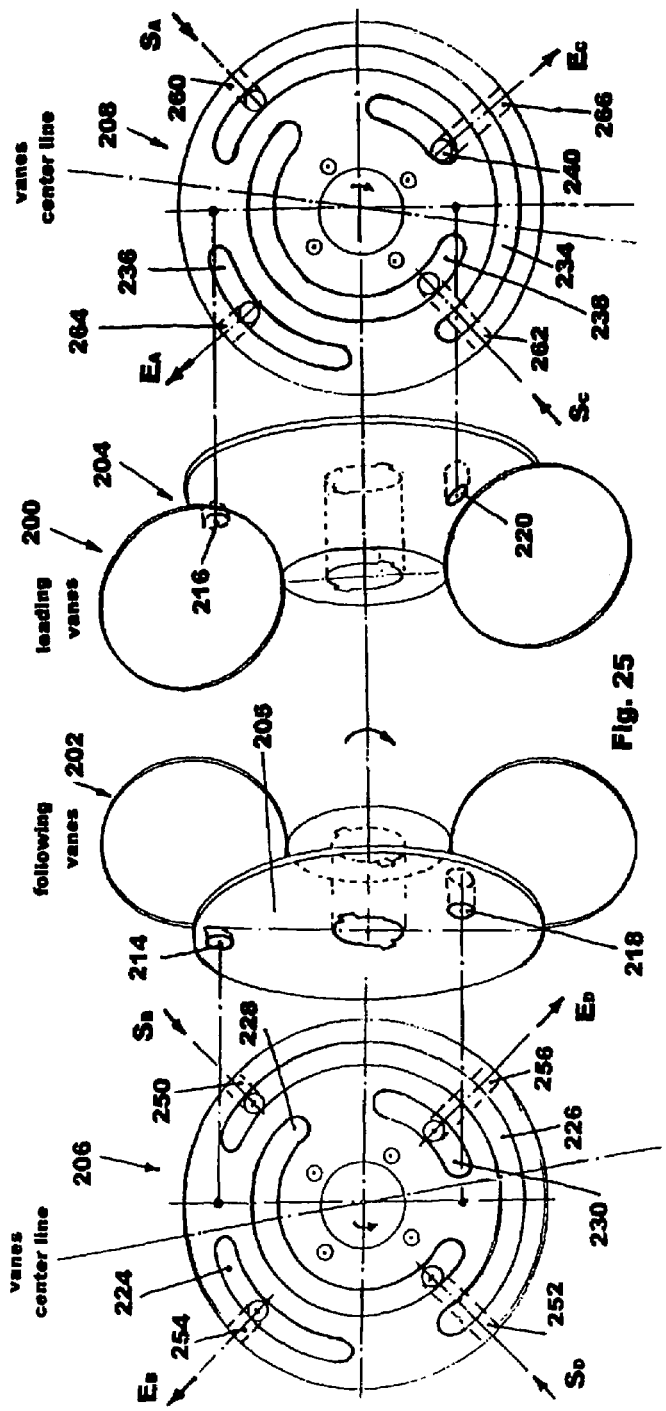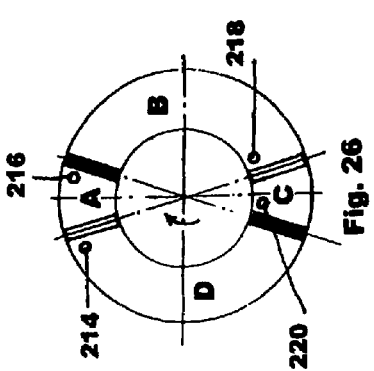

ORBITAL ENGINE/PUMP WITH MULTIPLE TOROIDAL CYLINDERS

FIELD OF THE INVENTION

The present invention relates to engines and pumps and in particular, relates to orbital engines and pump design improvements, allowing increase of engine power or pumping media volume by increasing an amount of chambers for each toroidal cylinder and planetary attachment of additional toroidal cylinders to common drive train with an additional, simplified valving arrangement, and defining formulas for gear parameters serving design improvements and increase of effectiveness.

BACKGROUND OF THE INVENTION

Various designs have been proposed for engines which use rotatable vanes which accelerate and decelerate relative to each other to define the various strokes of a combustion engine. Examples of rotary engines are disclosed in U.S. Pat. No. 3,203,405 and U.S. Pat. No. 3,730,654. These prior art vane engines have relatively complicated arrangements for controlling of the vanes movement and have not proved entirely satisfactory.

The Arov engine/pump disclosed in my prior Canadian Patent 2,077,275 offers a simple drive train comprising elliptical gears with an offset rotation axis which cooperate to form an elliptical drive train driving two pairs of vanes in toroidal cylinder, and creating two chambers for each toroidal cylinder.

First of the difficulties with my prior engine or pump was excessive pulsing of torque output for engine or excessive pulsing of media flow for pump with only two working chambers in one toroidal cylinder.

Second of the difficulties with my prior engine is the lack of a simple porting arrangement for media flow between the "cylinders" and housing inlet/outlet holes, compression and/or supplying a suitable air fuel mixture for combustion and valving for exhausting combustion products. With respect to a pump it is the introduction of a media to the pump during the intake and the discharging of the pressurized media during the discharge.

Another difficulty is multiplication of engine power or pump flow increase. It is desirable to keep the rotating mass relatively low for efficiency purposes.

The present invention overcomes a number of the above problems and also improves the operation and performance of an orbital type engine or pump introducing a method of gear parameter calculation allowing creation of four equal chambers in each toroidal cylinder; by multiplication of an amount of toroidal cylinders planetary to the input/output shaft using joint drive trains and by simplified valving for media flow.

SUMMARY OF THE INVENTION

An orbital engine or pump according to the present invention comprises a toroidal cylinder, two rotating impellers, each having two radial vanes, mounted in the toroidal cylinder with the vanes cooperating with said housing creating in toroidal cylinder, four working chambers between adjacent vanes. Each impeller associated with a valve element with passages for media flow for inletting and exhausting a working media. The valve elements control flow of working media between holes in the impeller and toroidal cylinder inlet/outlet holes for engine or pump.

In a preferred aspect of the invention, each impeller has two diagonally opposed vanes which rotate within a toroidal cylinder of said housing with four working chambers being defined between said vanes.

In a further aspect of the invention each valve element includes two outwardly extending nodes that rotate in a cylindrical valve portion of said housing, said nodes closing ports in said housing to said working chambers as a function of the angular position of said valve elements.

In a further aspect of the invention, there are two valve elements for each impeller, each having two outwardly extending nodes that rotate in cylindrical valve portion of said housing allowing separate control of media flow for all four chambers.

In a preferred aspect of the invention each valve element has a series of arcuate passages which correspond with ports in said housing to selectively open and close ports in said housing to said working chambers, each arcuate media passage including a port adjacent a vane of said engine or pump.

According to an aspect of the invention includes at least two combustion units interconnected by a common drive train such that vane positions in respective toroidal cylinders are maintained in synchronization with each other, and wherein each unit has four working chambers defined by rotating vanes which accelerate towards and away form adjacent vanes as the impellers rotate in the toroidal cylinder. The impellers of each unit are driven by corresponding gears of common gear train which controls the vane movement as a function of the position in said cylinder. The units cooperate with each other by being out of phase in a manner to reduce output variation.

In an aspect of the invention the engine includes a pump unit used as compressor driven by said common drive train and providing compressed media to said working chambers of combustion units.

In a preferred aspect of the invention the engine of said drive train includes at least 6 elliptical gears synchronizing vanes position in at least two combustion units, said at least 6 elliptical gears including gears in mesh for one pair of vanes of one combustion unit and a further gears in mesh for a second pair of vanes in the other combustion unit located from the opposite side of the gear train having the same vane rotation axis with the first unit.

BRIEF DESCRIPTION OF THE DRAWINGS

Preferred embodiments of the invention are shown in the drawings, wherein:

FIGS. 3, 4, 5 and 6 respectively show the compression expansion, exhaust and suction cycles of the engine;

FIG. 25 is an exploded perspective view of an alternate version of the engine or pump having stationary valve element with arcuate valve ports;

FIG. 26 is a schematic cross sectional view of the engine or pump of FIG. 25;

FIG. 27 is a cross sectional view of the stationary valve element;

DETAILED DESCRIPTION OF THE PREFERRED EMBODIMENTS

Figure 1:
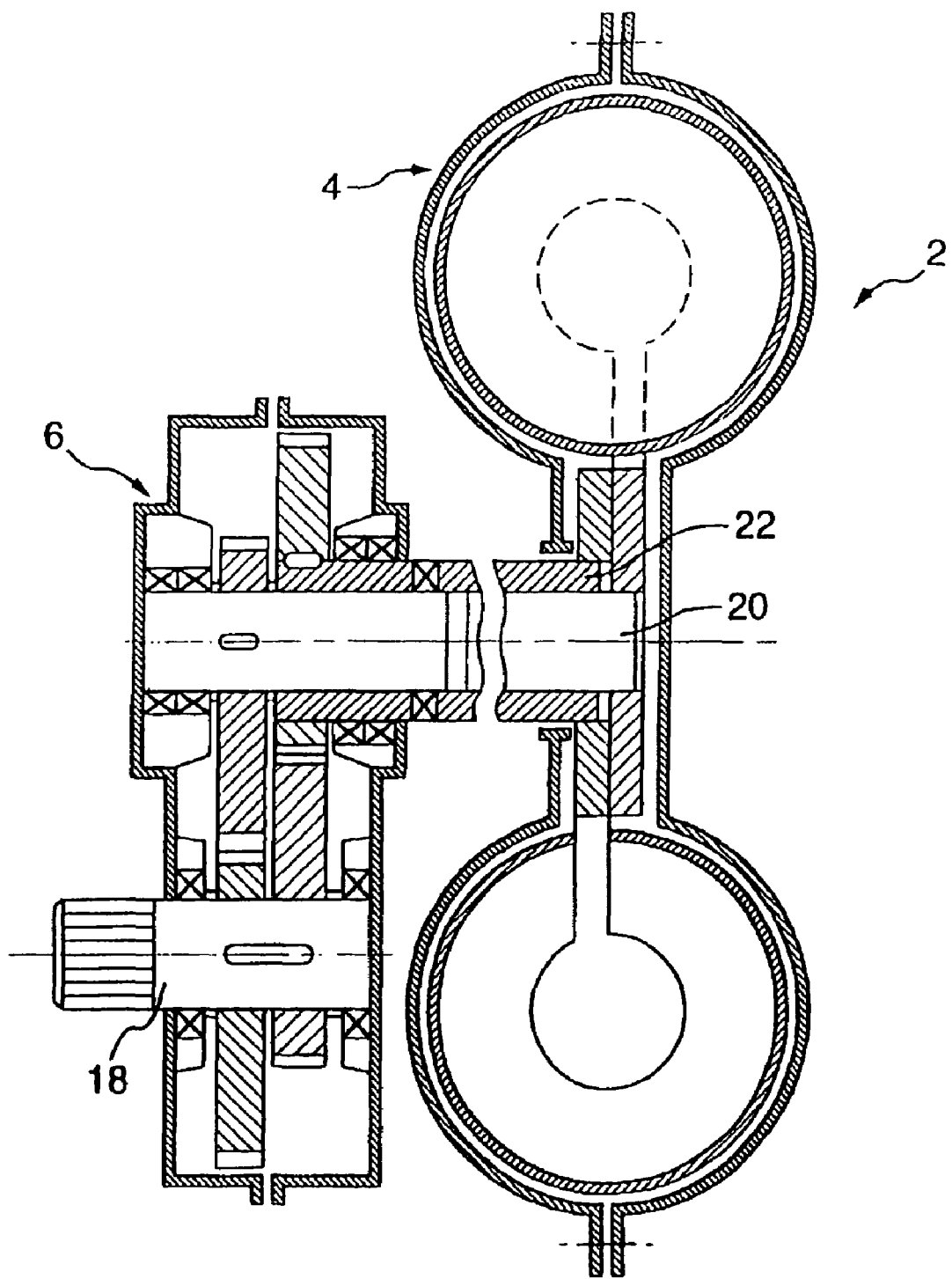
FIG. 1 is a cross section through the air of engine or pump and drive train arrangement.
Figure 2:
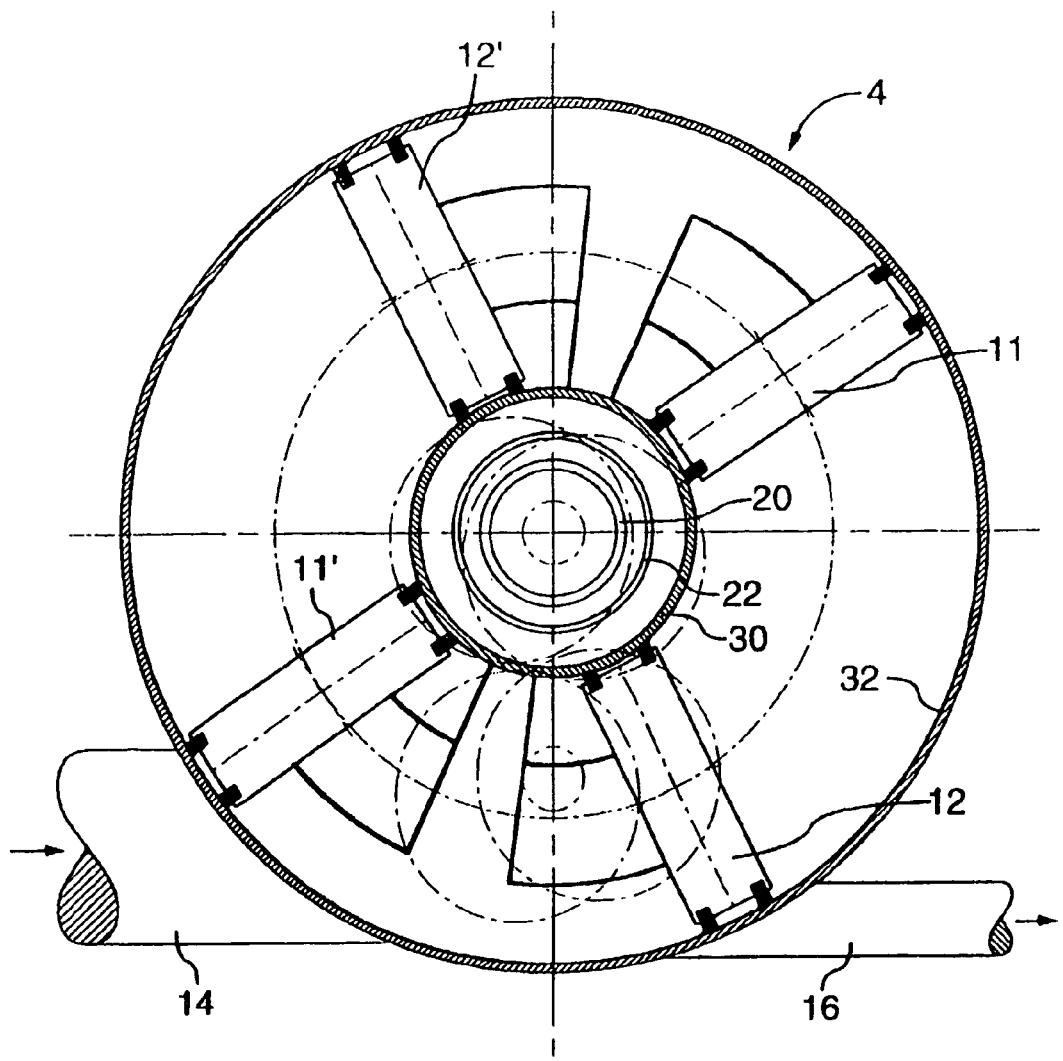
FIG. 2 is a vertical section through the engine or pump showing each of the impellers with vanes.

The engine 2, as shown in FIGS. 1 and 2, has a combustion unit with a toroidal cylinder and vane arrangement 4, in combination with a drive train arrangement for positioning of the vanes, generally shown as 6. The vanes the engine are shown as 11 and $11^1$ being diagonally opposite vanes and commonly attached, and associated vanes 12 and $12^1$ also being diagonally opposed and commonly connected. The pairs of vanes 11 and $11^1$ and 12 and $12^1$ also being diagonally opposed and commonly connected. The pairs of vanes 11 and $11^1$ and 12 and $12^1$ are separately associated with one of the inner coaxial shaft 20 and the outer coaxial shaft 22. Thus, one set of vanes is driven by one shaft and other pair of vanes is driven by the other shaft. The engine also includes an exhaust port 16 and intake port 14 associated with the movement of the vanes and fixed relative to the rotary cylinder defined by the inner cylinder wall 30 and the outer cylinder wall 32.

The cycle of the engine is shown in FIGS. 3 through 6. In FIG. 3, vanes 11 and $12^1$ are shown in the final stages of compression or exhaust states. In FIG. 4, the vanes have been moved to an intermediate position of expansion state, such as would be common if this is a suction or combustion after engine spark was introduced with completion of the compression cycle shown in FIG. 3. In this case, vane $12^1$ is accelerating away from vane $11^1$ and, thus, creates the combustion or suction stage. In FIG. 5, the vanes have moved to the end of combustion or suction stage or the start of compression or exhaust stage. In FIG. 6 the vanes have been moved to an intermediate position of compression or exhaust state and vane $12^1$ is accelerating towards vane $11^1$ and defines the compression or exhaust of the spent products of combustion.

Figure 7:
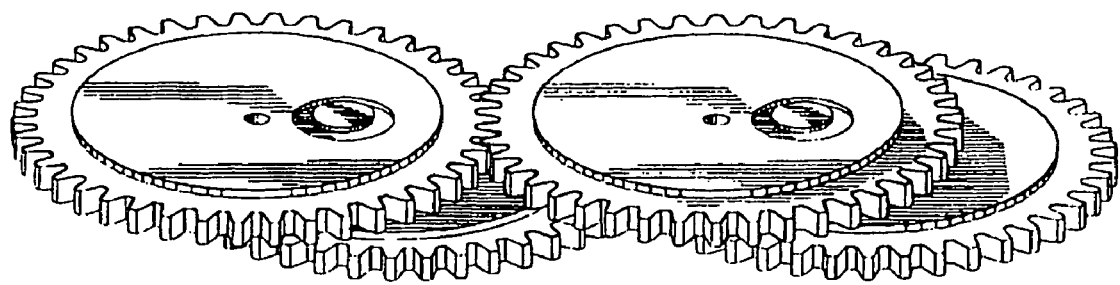
FIG. 7 is a partial perspective view of the elliptical drive train of the engine of FIG. 1.

FIG. 7 shows the elliptical gears interconnected to form two separate drive trains where the gears on the left are driven by a common shaft and the gears on the right are each driving one of the two coaxial shafts 20 and 22. This can be further understood with respect to a review of the exploded perspective vies of FIG. 8. In this case, a common shaft 18 drives the two elliptical gears 40*cl* and 40*cw*, with each of these gears being keyed to the shaft. In the preferred embodiment for driving of vanes, these gears are identical and are keyed to the shaft 180° out of phase. The degree of out of phase will depend upon the desired relationship of the movement resulting when the common shaft 18 is rotated and causes sympathetic movements of shafts 20 and 22. Any degree of out of phase is possible. Two separate drive trains are defined by a first pair of elliptical gears 40*cl* and elliptical gear 41 with a second drive train being defined between elliptical gear 40*c*2 and elliptical gear 43. Elliptical gear 41 is attached to the outer coaxial shaft 22 and elliptical gear 43 is keyed to the inner coaxial shaft 20.

Figure 8:
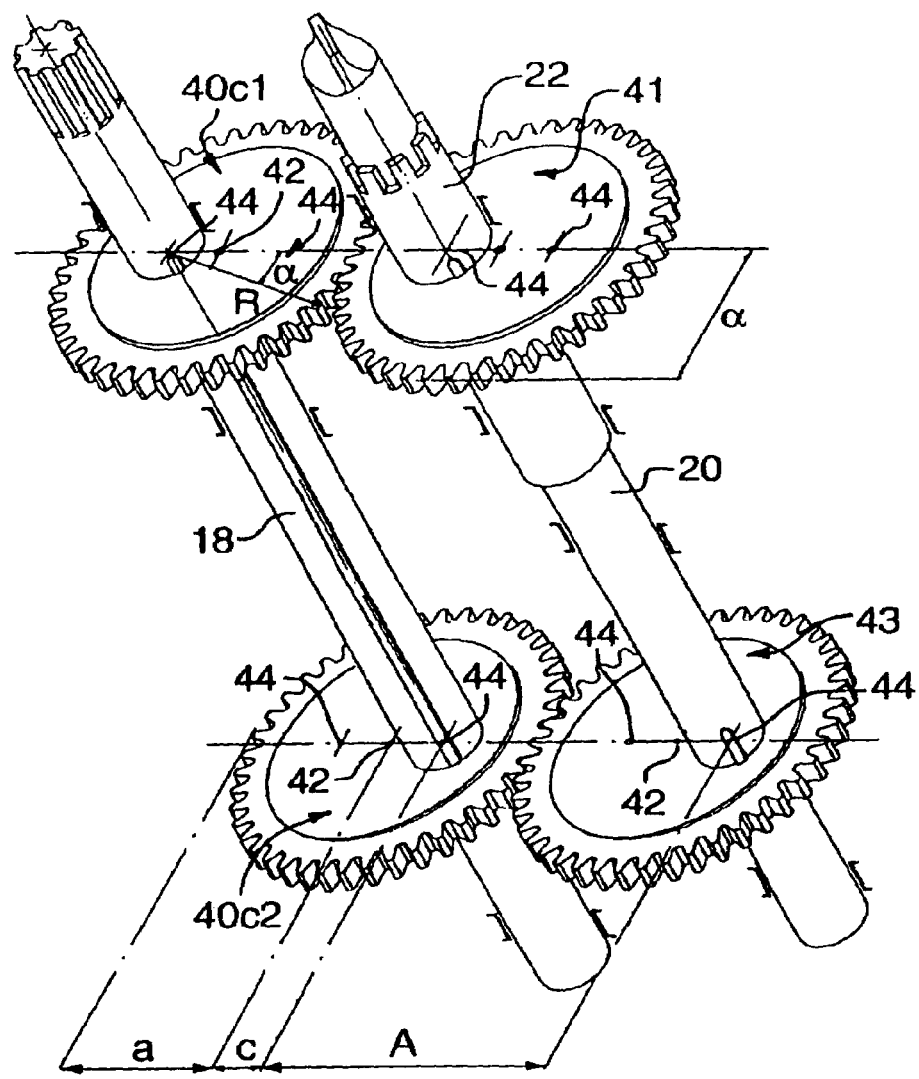
FIG. 8 is an exploded perspective view showing the various gears and drive trains used in the engine or pump of FIG. 1.
Figure 9:
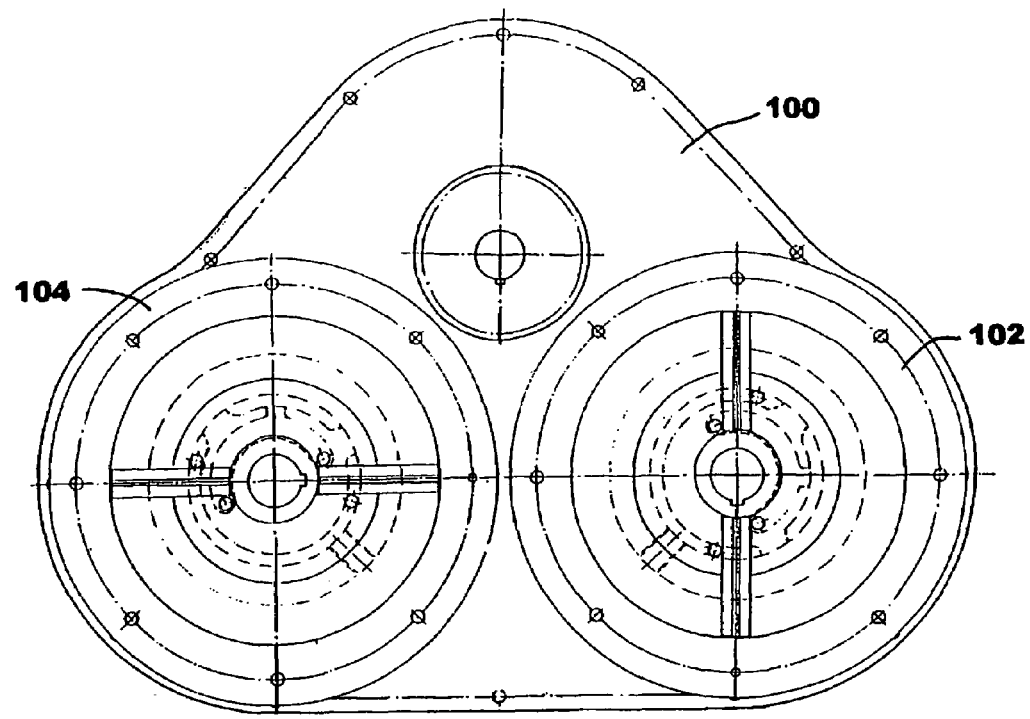
FIG. 9 is a sectional view through two combustion units interconnected by a common drive train.
Figure 10:
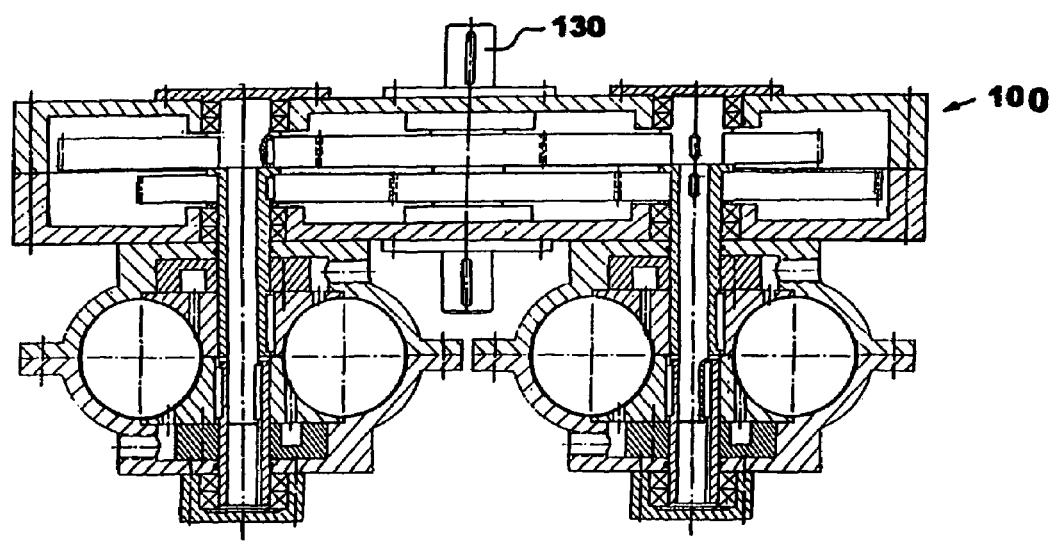
FIG. 10 is a sectional view through the engine showing the common gear train.
Figure 11:
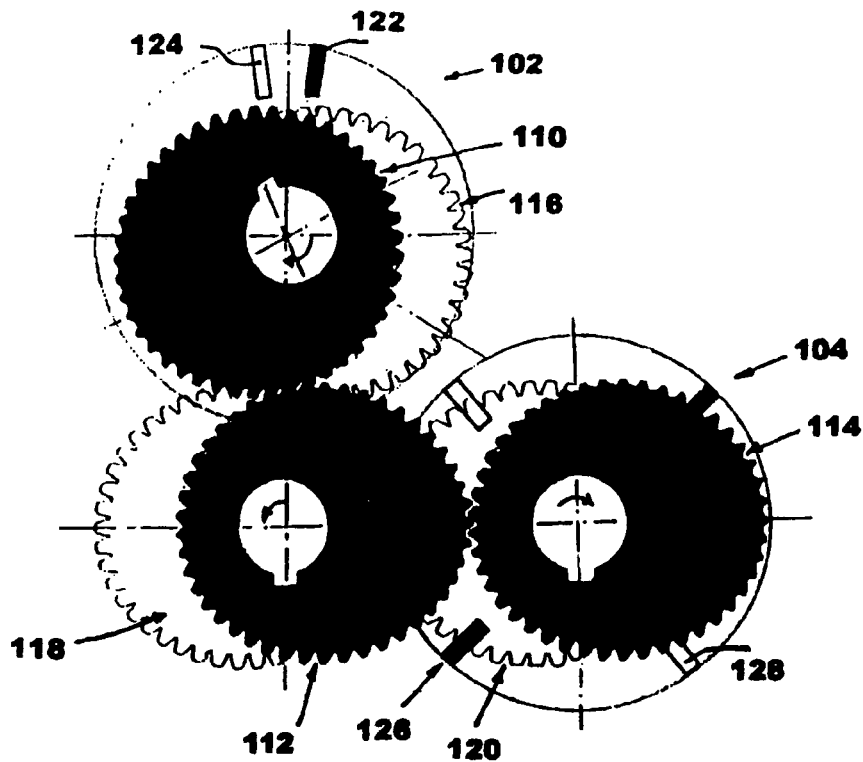
FIGS. 11 through 14 show the relationship of the two of FIG. 9 and the complementary positions of the vanes in the two toroidal cylinders.
Figure 12:
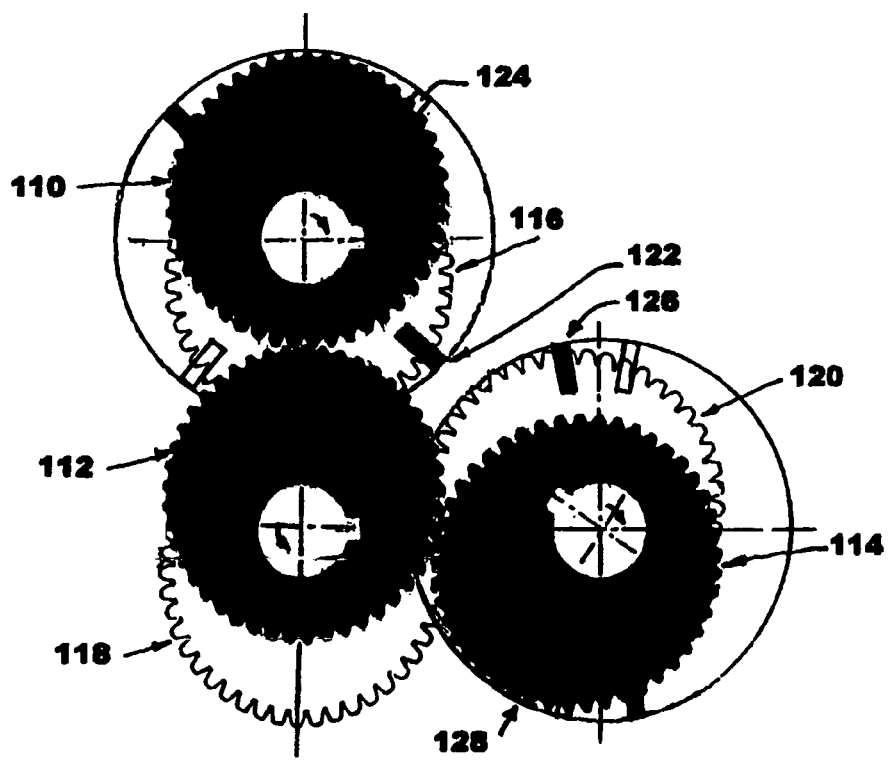
Figure 13:
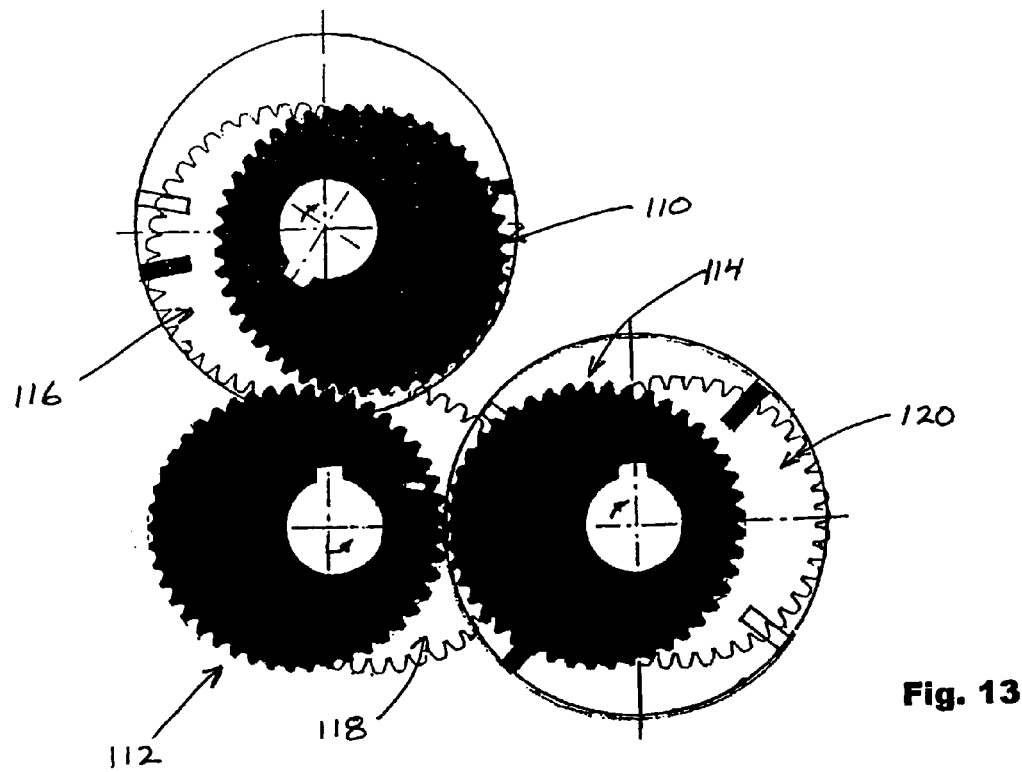
Figure 14:
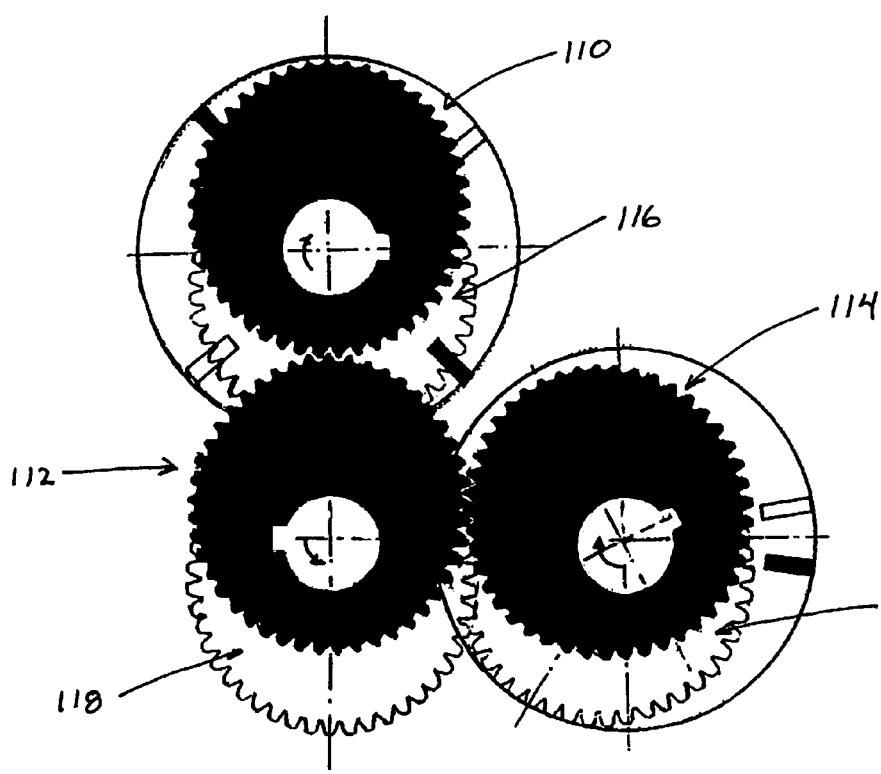

Each gear train or each securement of an elliptical gear to the respective shaft is positioned such that the elliptical gear rotates about one of its foci. The focus of each elliptical gear is shown as 44, whereas the geometric center of the gear is shown as 42. As shown in FIG. 8, the gears are positioned such that the foci are all aligned. This will occur at this position of the gears as well as when the gears have rotated 180°. With the gears in this position, it can be seen that the focus of one of the two gears is located between the common shaft 18 and the respective coaxial shaft 20 or 22, and the remaining focus is located beyond the shafts. It can also be seen that elliptical gear 40*cl* and elliptical gear 40*c*2 is 180° out of phase, and therefore, elliptical gears 41 and 43 will also be 180° out of phase. With this arrangement, four elliptical gears have been used to control the motion of the vanes and impart the desired degree of acceleration and deceleration. The use of the ellipse as a starting point for the drive train is desirable, in that each gear can be identical. The use of this shape also simplifies manufacture of the gears.

The exact characteristics of the ellipse can be varied to adjust the desired acceleration and deceleration of the vanes and also maximum vanes opening angle for a particular engine or pump. Although the present drive train has been described with respect to an engine 2, this engine, in fact, could be a pump corresponding to a toroidal piston type pump. In this case, the power would be inputted through the common shaft 18. In the case of an engine, the power output from the engine would be taken out common shaft 18, and because of the offsetting nature of the gears in the Arov engine, the power available to the common shaft would have fairly good leverage. This leverage is high as the forces of combustion act directly on, and are generally perpendicular to the vanes to cause rotary motion without conversion from linear to rotational movement as found in piston type engines. In addition, the gear train also increases the torque and horsepower characteristics due to the multiplier effect of the gear ratio. These characteristics change with angular position, however, twinning of combustion units smoothes the variations. It can also be appreciated that if vibration is a problem, appropriate counterweighting or modifying of the gears to provide a more efficient weight balancing can be used. Typically, counterweighting is not required for multiple unit operation.

FIGS. 9 through 14 show different details of the Arov twin engine 100. In this case, the first combustion unit 102 is connected via the gear train 106 to a similar or second combustion unit 104. With reference to the vanes generally shown in FIG. 9, the first and second combustion units are 90 degrees out of phase.

Twinning of the combustion units via the connecting gear train 106 considerably reduces the variations in the output torque. The connecting gear train 106 includes a first gear train comprising gears 110, 112 and 114 where vane 122 of combustion unit 102 is linked to the movement of vane 126 in toroidal cylinder of combustion unit 104. A second set of gears 116, 118 and 120 are used to control the position of vane 124 of combustion unit 102 toroidal cylinder and vane 128 in toroidal cylinder of combustion unit 104. As can be appreciated there are opposite vanes in each engine which are not discussed. These vanes are paired with a vane of the opposite engine.

The output from the engine is transmitted through shaft 130. It can be appreciated that if this is a pump arrangement, then the outward shaft 130 would be an input shaft 130. As can be appreciated from a review of FIGS. 11 through 14, a first gear train of three gears and a second gear train of three gears control and coordinate the movement of the vanes in a first toroidal cylinder of combustion unit 104 and in a second toroidal cylinder of combustion unit 104 in a particular manner. With this arrangement, the torque output of the twin engine has considerably less variation. If the arrangement is used as a pumping arrangement, the output of the pumps can be combined and less variation in the motor torque occurs. Preferably, the gear train arrangement includes three pairs of elliptical gears where a middle set of elliptical gears acts to tie the two combustion units together. Each of the gears is preferably an elliptical gear with an offset shaft drive position. In a preferred embodiment, all gears are the same. In the pump application it is possible to use the unit to extract power from a pressurized gas or steam. In this case, the pressurized media powers the unit, which is driving an electrical generator or other device. The pressurized gas will reduce in pressure. This is useful reducing pressure in natural gas and using steam energy to generate electricity.

Figure 16:
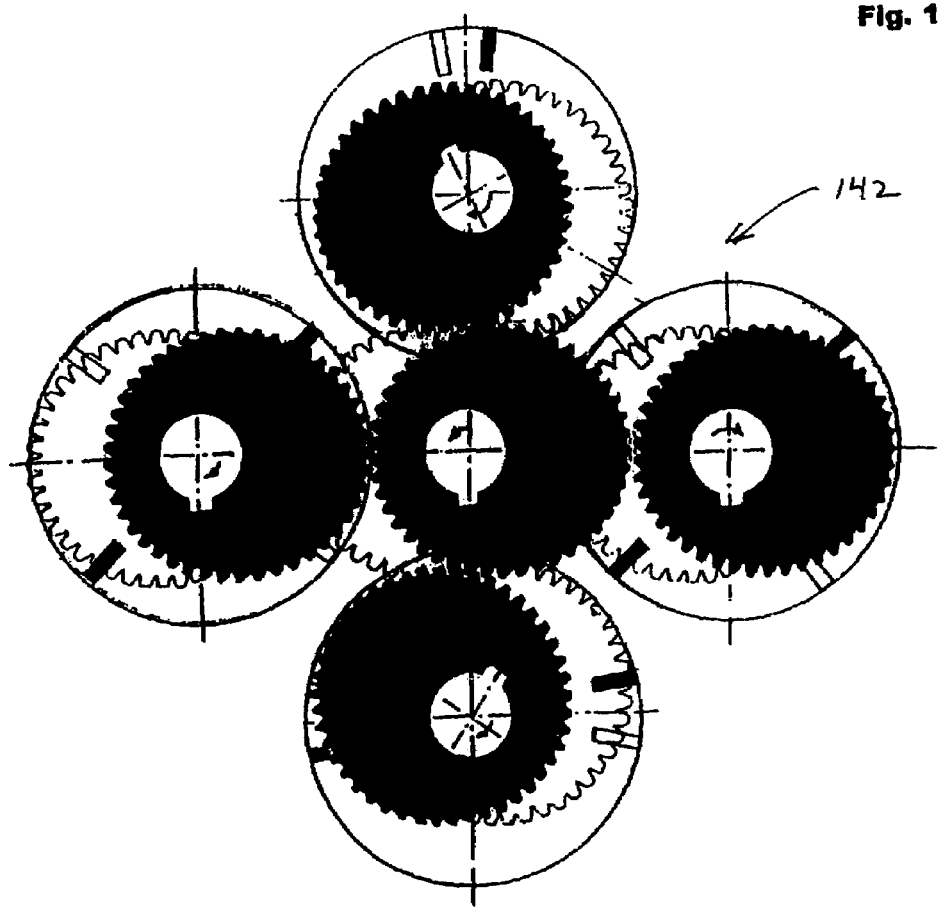
FIG. 16 is a top view of the combination of FIG. 15 showing the gears of the drive train.

The general concept of combining several combustion units via an intermediate pair of gears is further expanded in FIG. 16. This Figure shows a common central pair of gears with four combustion units positioned planetary thereto and in mesh with the central gears. From a review of FIG. 16, it can be seen the combination of four combustion units using the particular gear train.

Figure 15:
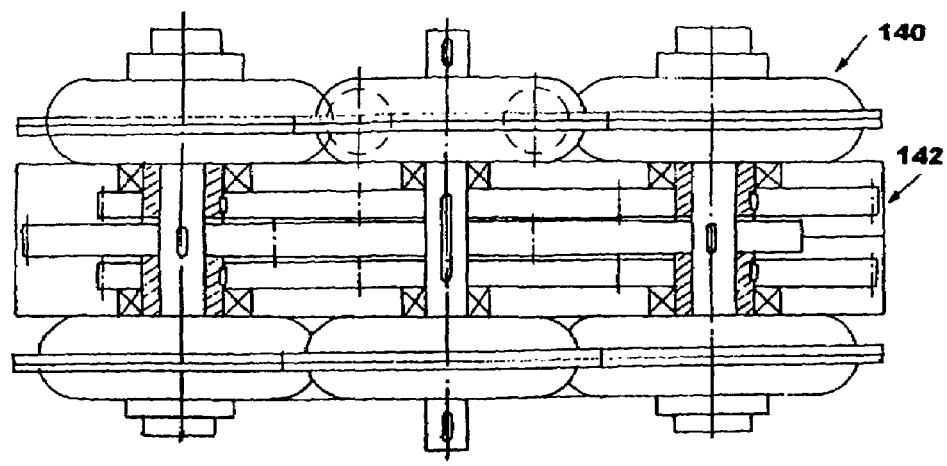
FIG. 15 is a partial sectional view through eight engine or pump units interconnected by a particular drive train.

The concept generally shown in FIG. 16 is again expanded in the embodiment of FIG. 15. In this case, the multiple Arov engine 140 has eight combustion units tied together. Four of these units are using a first and a second row of Gears in the gear train 142. The connecting gear train 142 has three levels of elliptical gear trains. Basically, the connecting gear train for eight units can share one set of connecting gears thereby reducing the number of gears and the number of layers of gears. Stacking of the Arov engines requires two hollow shafts for each pair of engines and a common shaft for each pair of engines. The common shaft is connected to the middle gear in the stack of gears.

Figure 17:
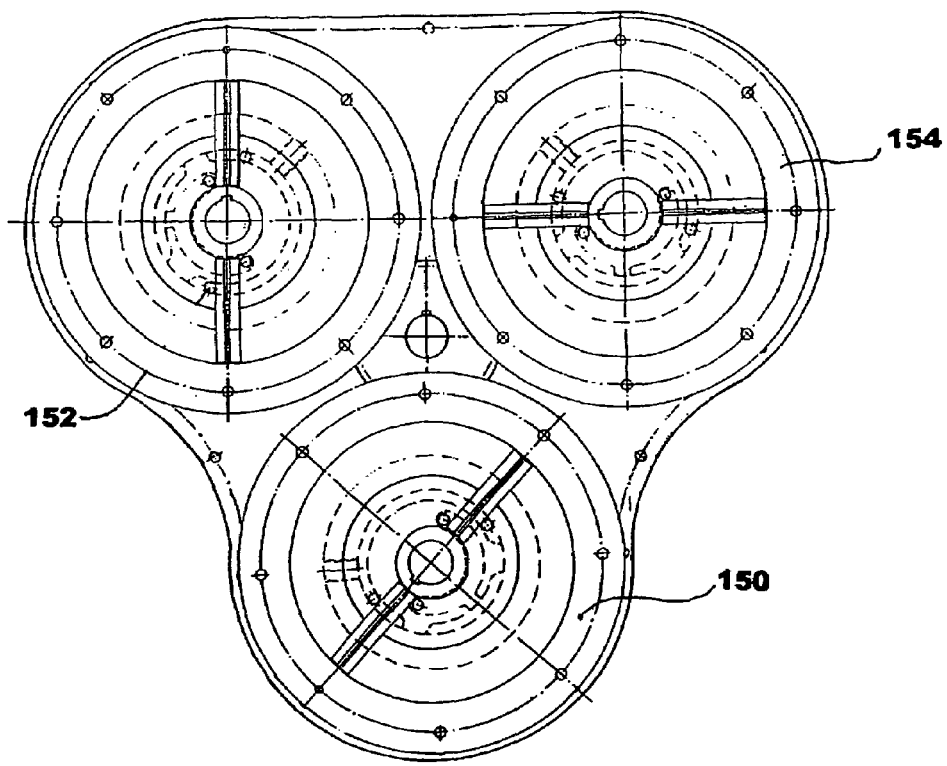
FIG. 17 is a top view of an engine combination having three combustion units (twelve chambers)
Figure 18:
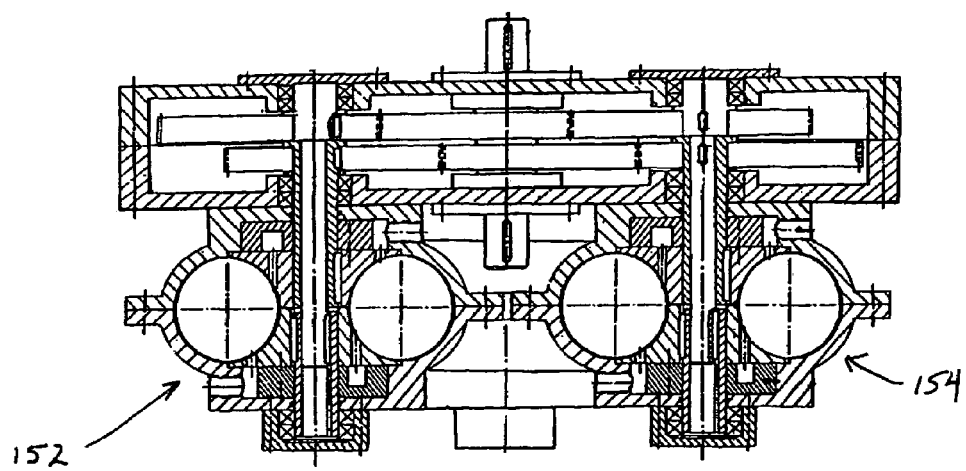
FIG. 18 is a sectional view through the engine of FIG. 17.

A further variation of the multiple Arov engine is shown in FIG. 17. In some cases, it is desirable to use a triple Arov engine as shown in FIG. 17. Each of the individual units is coordinated with the other and the output torque has considerably less variation.

A further variation of the structure of FIG. 17 is using one of the units 150 as a compressor for feeding compressed air and/or air and fuel to the combustion units 152 and 154. This provides advantages by eliminating compression and suction steps for both engine cylinders. The compression unit 150 need not operate at the identical speed to the orbital engines and preferably operates at higher multiple speeds or has a bigger size.

One of the issues associated with an orbital engine or multiple orbital engines as disclosed in the present application, is providing a simple valving arrangement for the intake and exhaust corresponding with the space between the leading and trailing rotary vanes. A number of different valving arrangements are possible which use a rotary valve element associated with the vanes and housing as will be described with respect to FIGS. 19 through 24.

Figure 23:
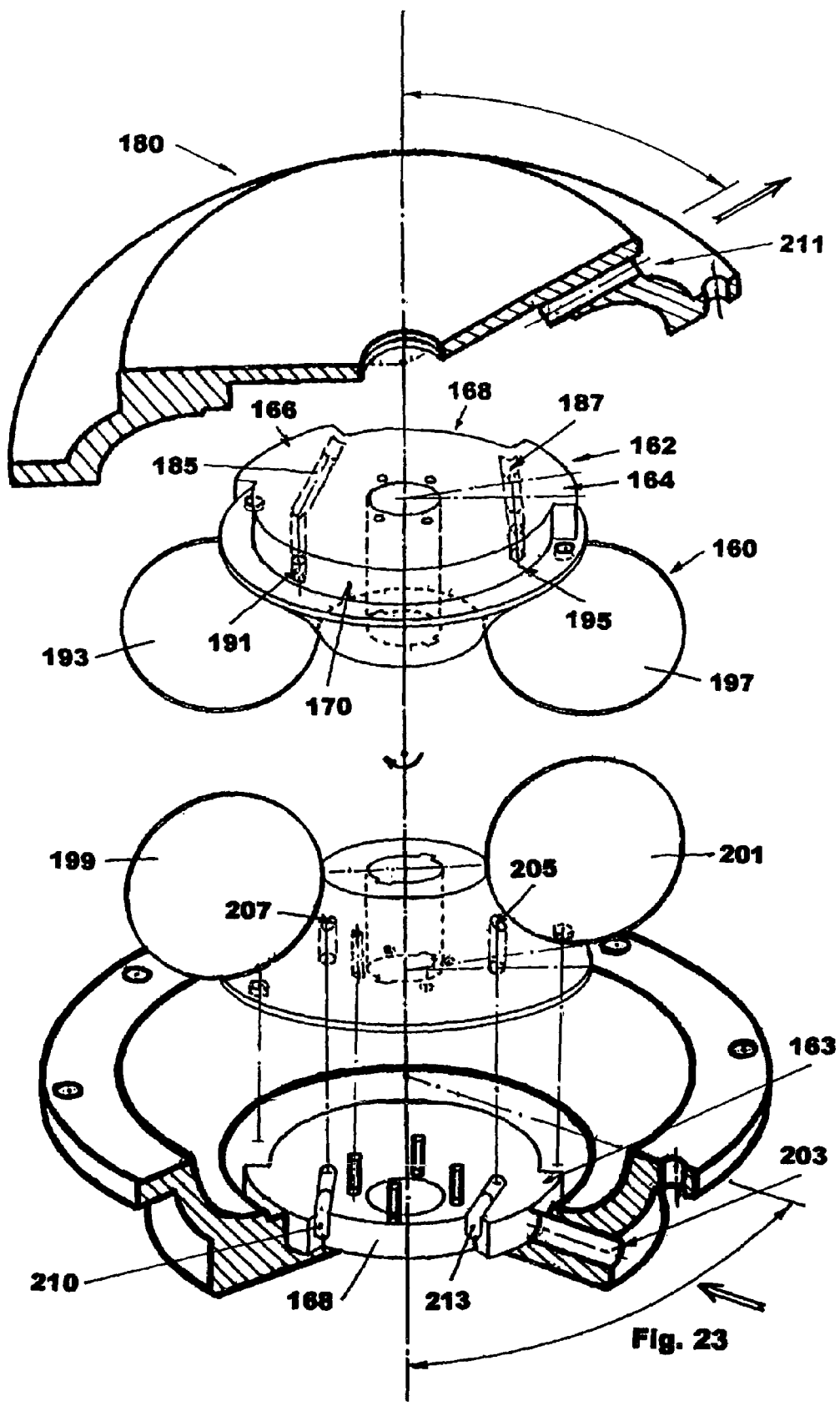
FIG. 23 is an exploded perspective view of an engine or pump unit showing a particular valving arrangement.

As shown in FIG. 23, each set of rotary vanes 160 has associated therewith at least one rotary valve element 162. This rotary valve element includes two outwardly extending lobes 164 and 166 which are separated from each other by connecting gaps 168 and 170. Basically, the outwardly extending lobes 164 and 166 close the intake or exhaust ports associated with the housing 180. The connecting passage 185 connects the inlet 168 to a discharge location 191 associated with the vane 193. A similar passage 187 connects inlet 168 with the discharge port 195 associated with the vane 197. In this way, the rotary valve element 162 allows connection of a port with a desired position associated with the particular vanes 193 and 197. At the bottom of FIG. 23, a similar arrangement is associated with the further vanes 199 and 201. An intake port 203 is shown at the base of FIG. 23 and is presently closed by the lobe 163. It can be seen how the ports in the rotary valve element also connect with the desired discharge positions 205 and 207 at desired points relative to the vanes 201 and 199. An exhaust in the housing port 211 is shown near the top of the engine of FIG. 23.

The ports 191, 195, 205 and 207, and the passages 185, 187, 210 and 213 form both inlet passages and exhaust passages for the working chambers defined between the vanes. With this arrangement, four working chambers have supply and release of media defined by the two rotary valves.

With this arrangement, the particular ports associated with the housing of the engine are connected to the rotary vanes to discharge at a desired location at a particular point relative to the vane. This provides an efficient valving arrangement for combustion and exhaust strokes or supply and pressure strokes associated with an engine or pump. The individual parts can be easily pinned or joined together for proper synchronization.

Figure 19:
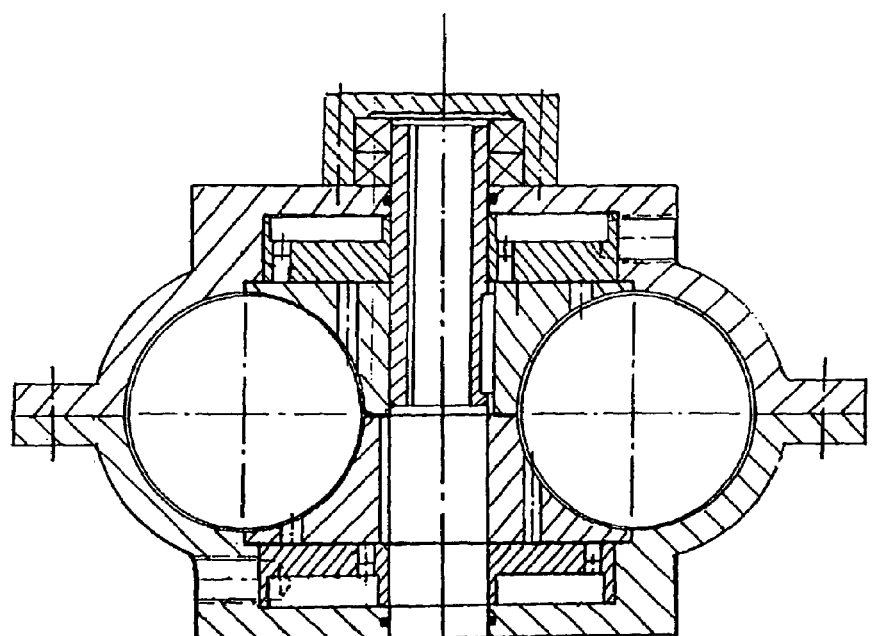
FIG. 19 is a vertical section view through an engine or pump unit showing a particular valving arrangement for introducing a working media during the intake stroke and in the exhaust stroke.
Figure 20:
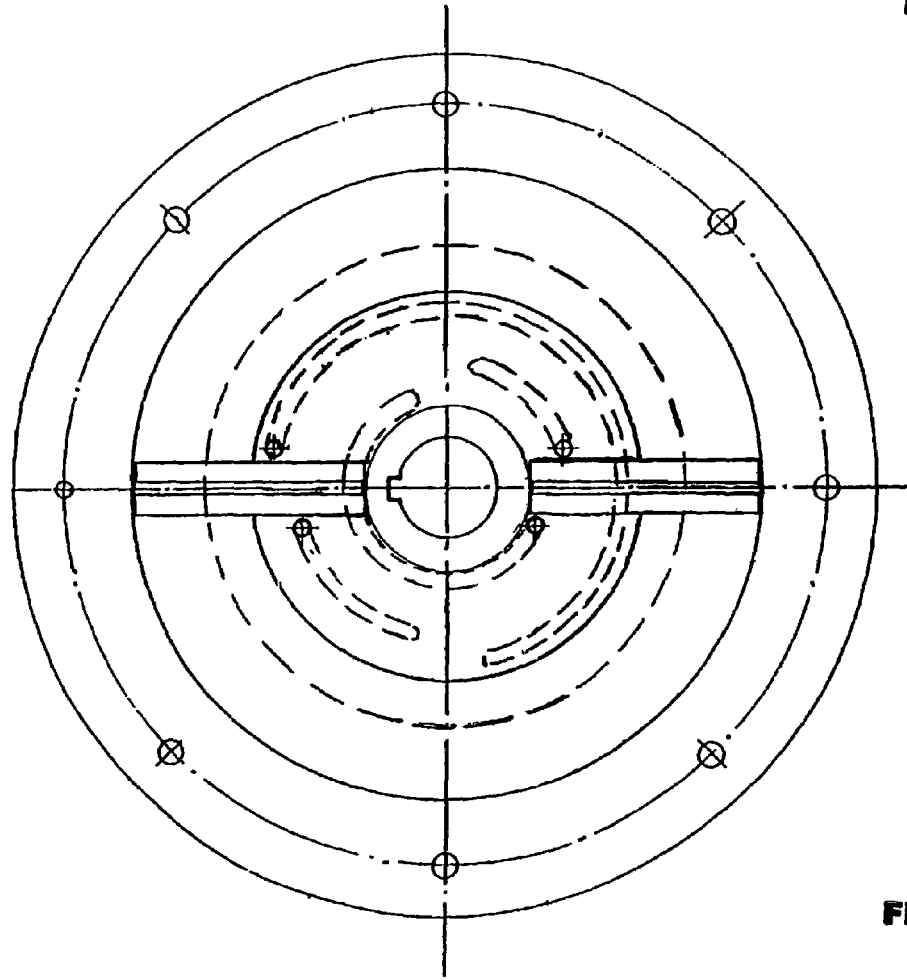
FIG. 20 is a top view showing the valve porting of FIG. 19.
Figure 21:
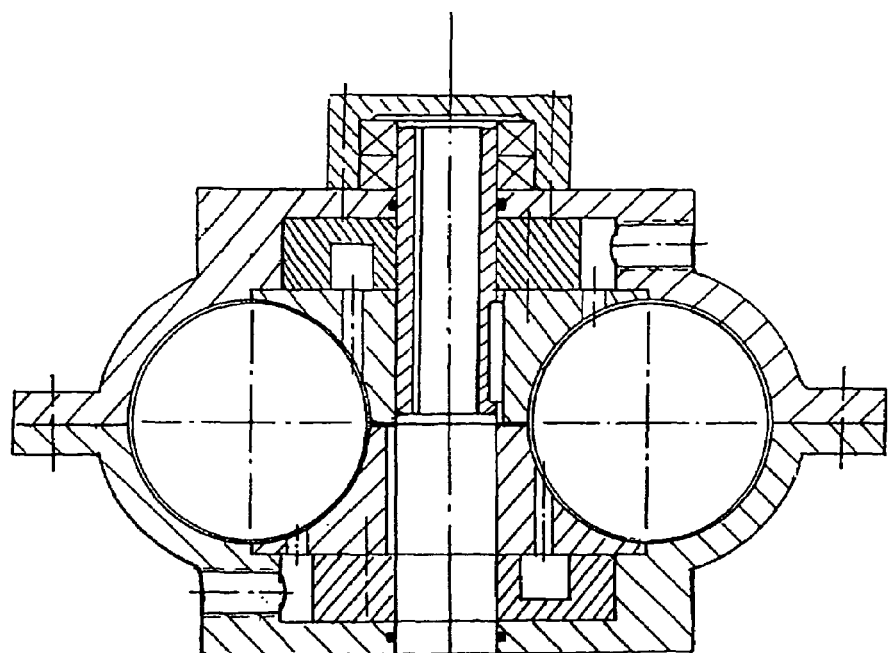
FIG. 21 is a sectional view through the engine or pump unit having a different valving arrangement.
Figure 22:
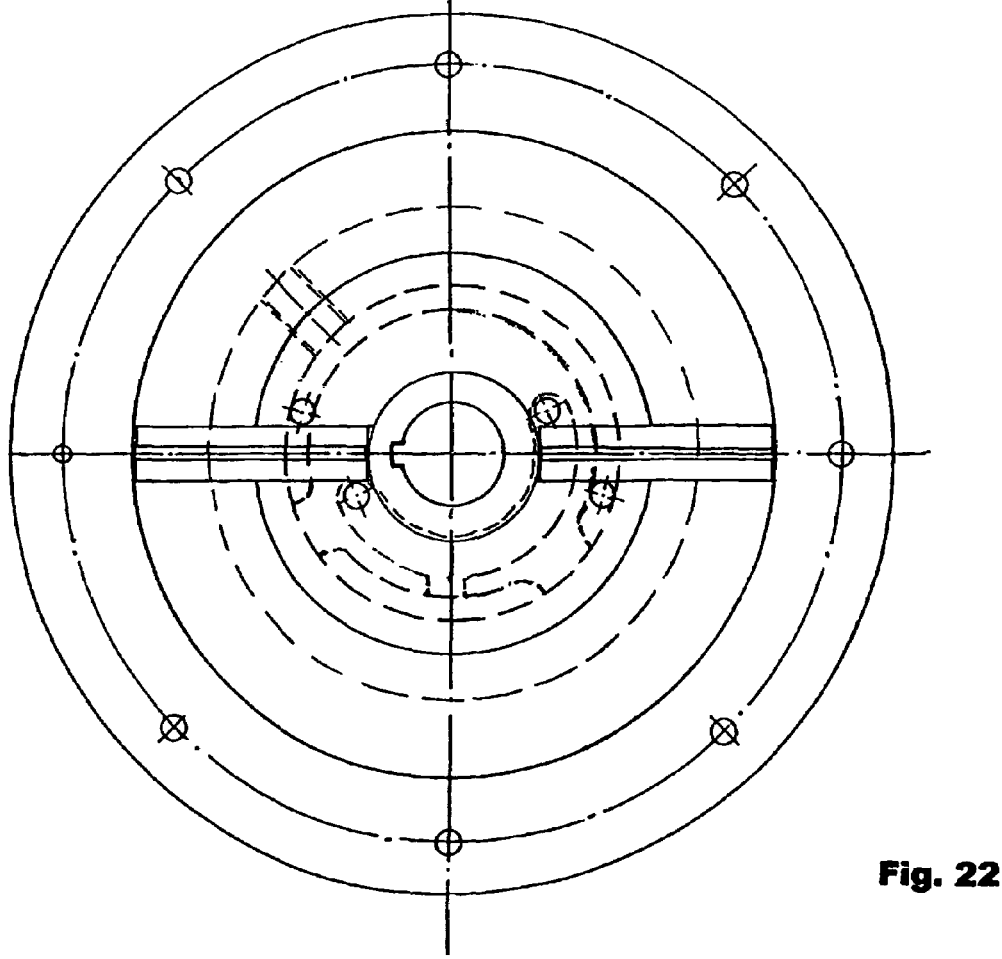
FIG. 22 is a top view of the engine or pump unit of FIG. 21 showing the valving.
Figure 24:
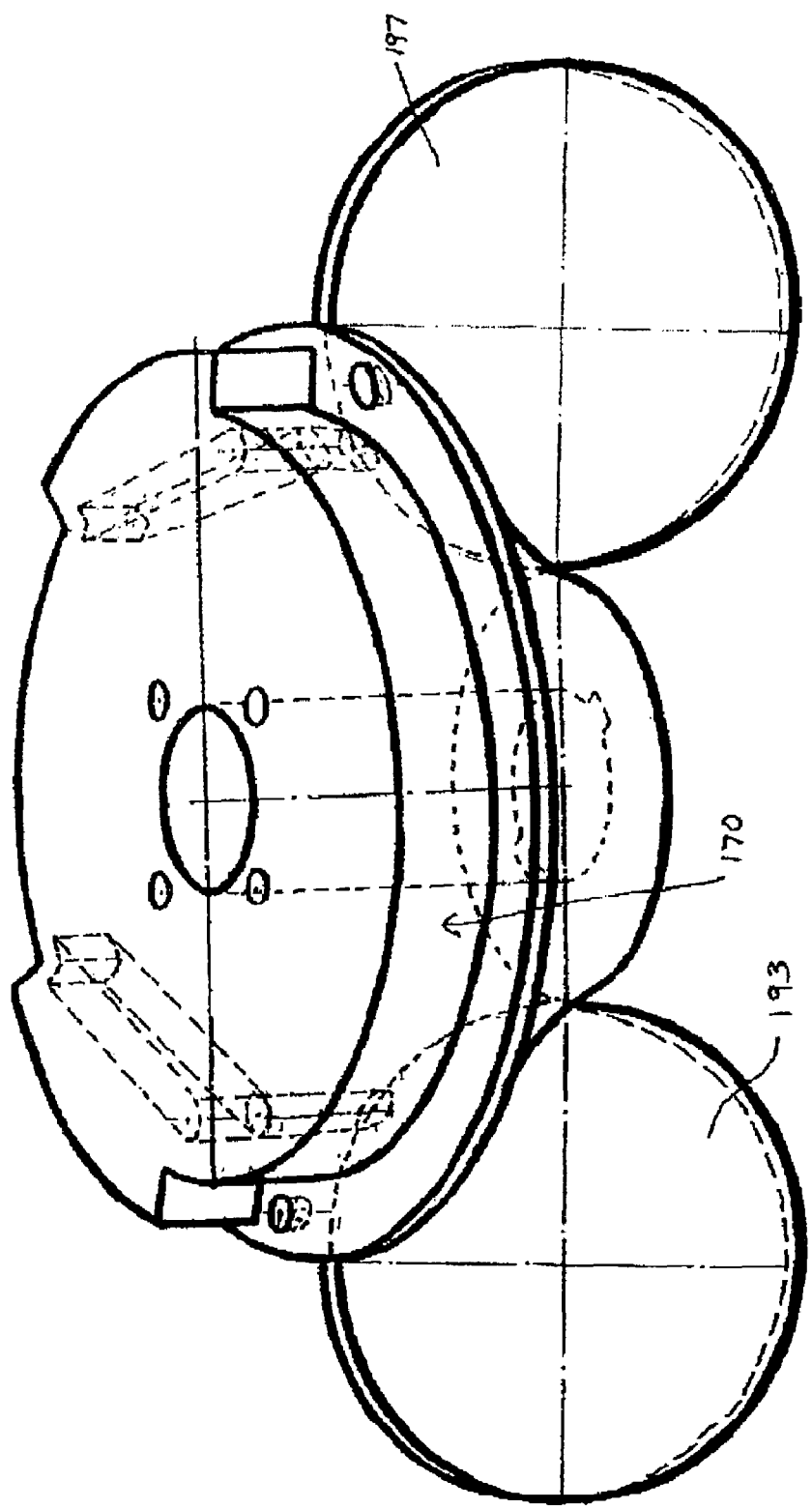
FIG. 24 shows the impeller and rotating valve element with a pair of rotary vanes.

In the embodiments of Figures of 21 and 22, two rotary valve elements are used. It is possible to use a different rotary valve element as generally shown in FIGS. 19, 20 and 24. In this case, a series of channels at different positions are provided and are connected with the corresponding vanes for the desired positioning. This is necessary for a four stroke design. In some cases, the engine or pump will have only two working chambers by interconnecting chambers in pairs.

Thus alternate valving arrangement is schematically shown in the exploded perspective view of FIG. 25. In this case for clarity, the left and right stationary valve elements have been rotated 90 degrees such that the various channels are visible. In practice, these would be turned to face the circular plate member of the vane followers for operation with the ports in the circular member.

The engine assembly 200 as show in FIG. 25 has a left impeller with vanes 202, a right impeller with vanes 204, a left stationary valve element 206, and a right stationary valve element 208. The left impeller with vanes shows the following vanes where the right impeller with vanes shows the leading vanes. The left impeller 205 which rotates with the vanes and includes therein port 214 and port 218. Port 214 as illustrated in FIG. 26 is located adjacent an exterior portion of the vane and port 218 is positioned at a reduced radial spacing. Port 214 cooperates with feed track 226 and the exhaust track 224 whereas port 218 cooperates with feed track 228 and exhaust track 230.

With the right impeller with vanes and the right stationary valve element, port 216 cooperates with feed track 234 and exhaust track 236 and port 220 cooperates with feed track 238 and exhaust track 240. Each of the ports 214, 216, 218 and 220 are positioned to slide over their respective tracks and form either an inlet or an exhaust function. Once these ports move to a position where they are not connected to the tracks, this is a closed valve condition. In addition, it is possible to have each of the suction or exhaust inlets or outlets 250, 252, 254, 256, 260, 262, 264 and 266, have their own valve element which can be opened or closed. This is of assistance where the four stage cycle is completed in 720 degrees of rotation.

With the orbital engine of FIG. 25, there are effectively four inlets and four exhaust outlets. Each of the impellers include their own stationary valve element having the various tracks therein for connecting with ports associated with each of the chambers where these ports are used for inlet or exhaust purposes.

The sectional view through the stationary valve shown in FIG. 27 shows the feed track 234 connected to the feed inlet 260 as well as the feed track 238 connected to the feed inlet 262.

Figure 28:
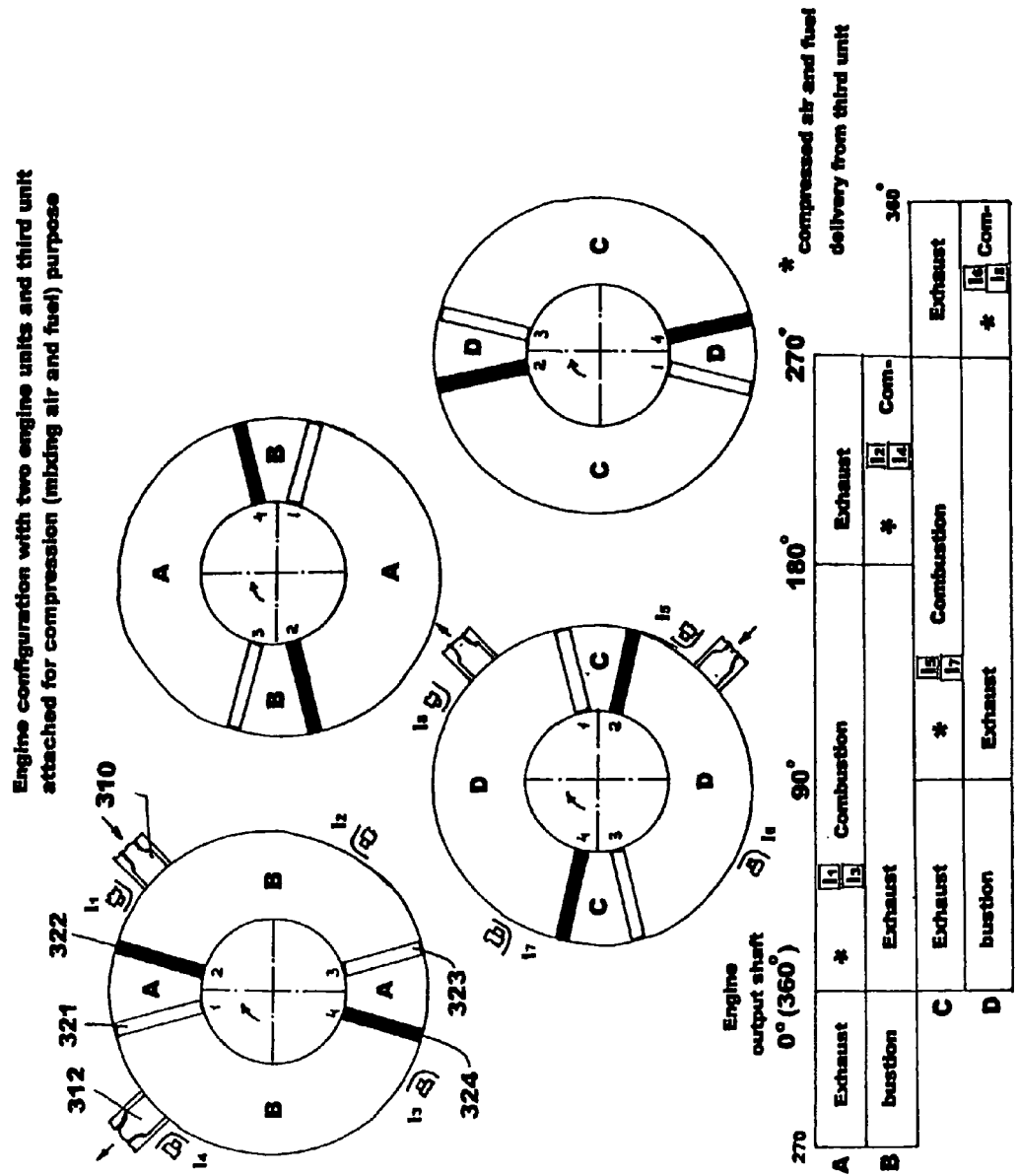
FIG. 28 shows the orbital engine at different angular positions and the cycles thereof when compressed media of air and fuel is provided to the engine unit at the appropriate times.

FIG. 28 is a schematic showing a twin engine configuration where each of the combustion units is being fed a compressed mixture of air and fuel for combustion. The first upper unit shows four working chambers, namely two chambers A and two chambers B. The valving for appropriately providing compressed air through inlet 310 and exhausting from many of the working chambers through outlet 312 would preferably use the two rotary valve elements shown in FIG. 23. Chamber A with its charge of compressed air and fuel is about to pass ignition points 11 and 13 which will occur at approximately 45 degrees as shown in the chart of FIG. 28. The leading vane 322, 324 will then quickly accelerate from the trailing vane 321, 323. Combustion and expansion continues to approximately 180 degrees of shaft 130 rotation. This will have caused an exhaust stroke after combustion in chamber B which will then receive a compressed air and fuel charge and undergo its own combustion cycle. Four ignition sources, I1, I2, I3 and I4 are shown.

The second lower unit which is linked by a gear train as shown in the earlier Figures is shown below upper unit A and is out of phase by 90 degrees. Similar structures shown and the combustion cycle is 90 degrees apart with this arrangement a smoothing of a torque output is achieved. As seen from the timing diagram associated with the chambers A, B, C and D, the combustion portions of the chambers overlap such that relative to the combined engine, there is always a combustion stroke at all times. The power of the combustion stroke will change somewhat, however, as the combustion stroke of one chamber starts to decrease, the combustion stroke in the other is starting to increase. In this way, the torque output is relatively smooth.

Figure 29:
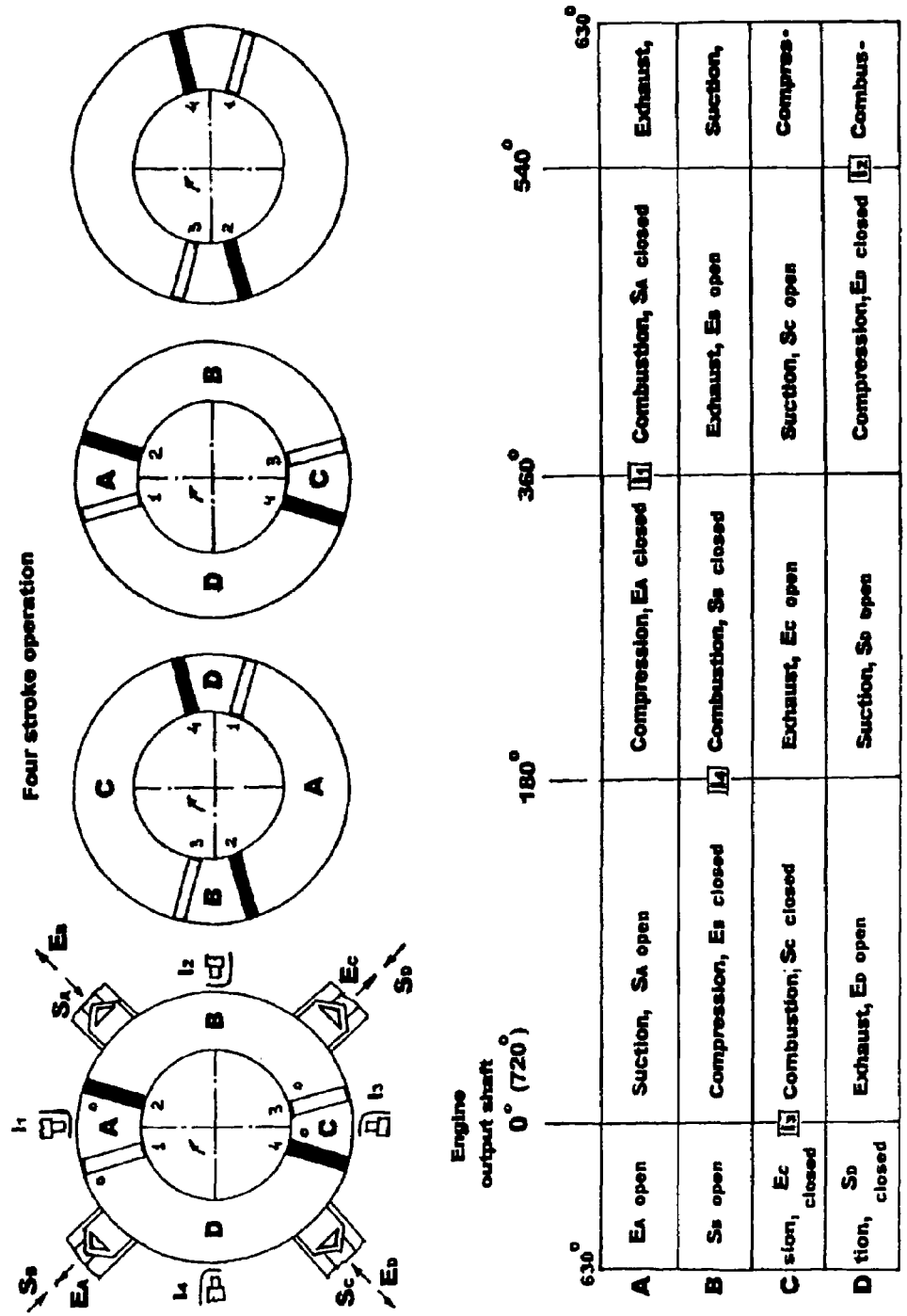
FIG. 29 is a schematic view similar to FIG. 28 showing the operation of the Arov orbital engine for a four "cylinder" four stroke operation where a complete cycle takes two revolutions or 720 degrees.

FIG. 29 shows an overall schematic of the four stroke operation of the Arov engine. In this case, each of the four inlets shown can be selectively closed using suitable valving as previously described. With this structure, the four step cycle for each combustion chamber is carried out over 720 degrees, four different ignition sources I1, I2, I3 and I4 are shown. With respect to combustion chamber A, for the first 180 degrees shaft 130 rotation, a chamber is expanding to draw air into the chamber, between 180 and 360 degrees the chamber is reduced in size to form the compression stroke. Fuel is appropriately added either during the suction stage or during the compression stroke. At about 360 degrees, I1 fires, causing combustion and expansion of chamber A for the next 180 degrees. The following 180 degrees forms the exhaust stroke. The chart of FIG. 29 shows the various stages for each of the chambers relative to chamber A.

Figure 30:
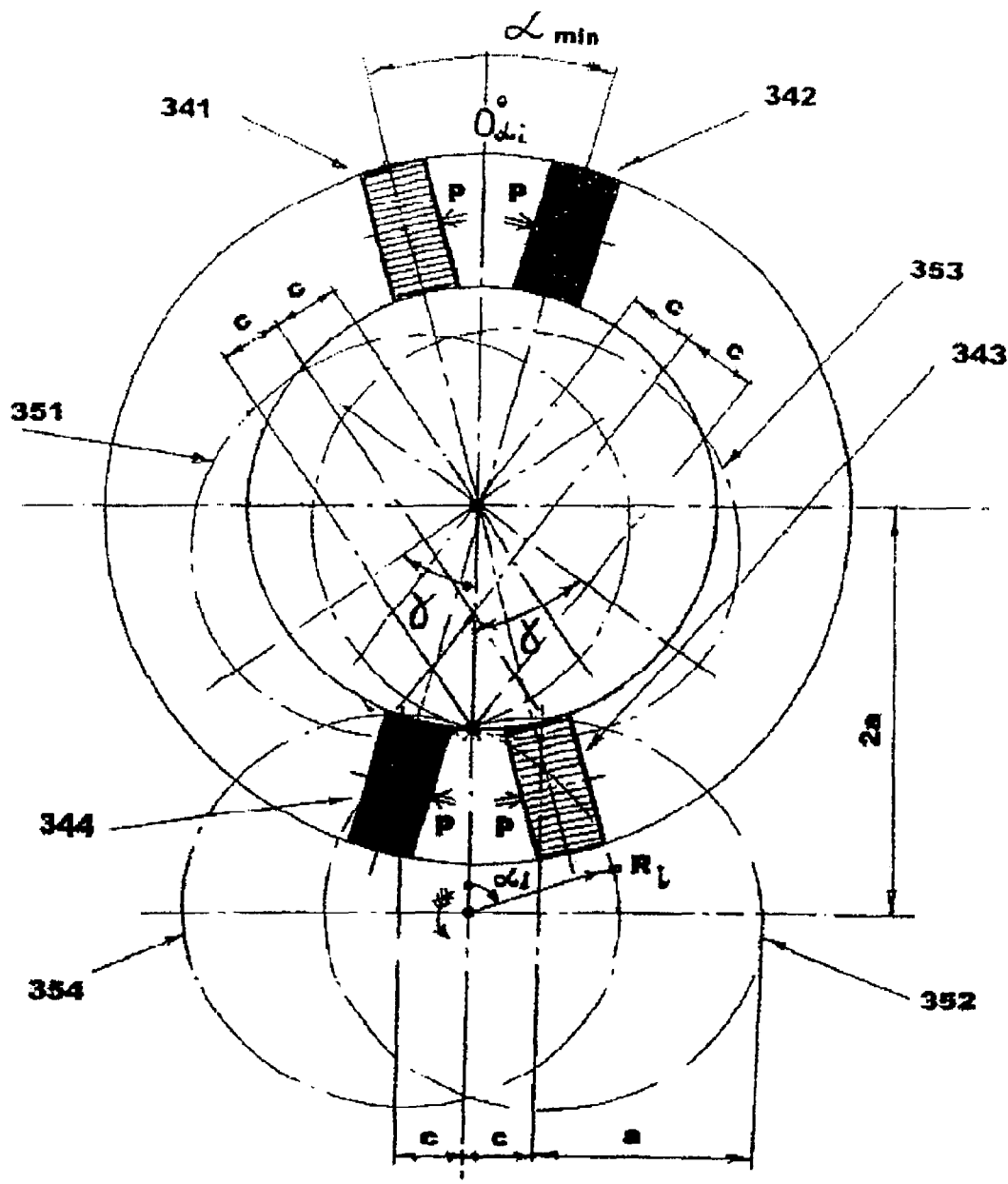
FIG. 30 is a schematic view of a toroidal cylinder with four vanes and corresponding gears, in the background, with parameters for gears.

FIG. 30 shows a gear arrangement for a single toroidal cylinder and method of calculation of elliptical gear parameters in consideration of a minimum vane opening to allow four chambers in every toroidal cylinder. In this Figure, leading impeller with vanes 342, 344 associated with gears 352, 352, and trailing impeller with vanes 341, 343 associated with gears 354, 353. Gears 352, 354 are preferably 180 degrees out of phase located on input/output shaft and shown in FIG. 30 rotating counterclockwise. In this case, both impellers with vanes continuously rotate clockwise with variable speed. In order to create four chambers, a method of calculation of elliptical gear parameters will be as follows:

$$Y = 45° + \frac{\alpha \min}{2}$$

Where $\gamma$ is angle between bigger ellipse axis ($2a$) and vector from ellipse center to the point on ellipse at intersection of perpendicular to this axis located on the double of focal distance ($2C$) from ellipse center with:

$$C = \frac{a \times \cos Y}{1 + \sin Y} = \text{focal distance}$$

In case of engine, torque on output shaft will be difference between torque created by leading impeller minus torque created by the trailing impeller.

Combustion torque P.D=Mc where D is diametric center of toroidal cylinder is equally applied to vanes on both impellers and distributed to output shaft through gears 351, 352, 353, 354.

For leading impeller torque magnification $$i_1 = \frac{R_{352}}{R_{351}} = \frac{a^2 + c^2}{a^2 - c^2} + \frac{2ac}{a^2 - c^2} \sin \alpha_i$$

With $\alpha_i$ changing 0°→180° during combustion and 180° rotation of output shaft ccw.

For trailing impeller torque reduction (opposite force direction)

$$i_2 = \frac{R_{354}}{R_{353}} = \frac{a^2 + c^2}{a^2 - c^2} - \frac{2ac}{a^2 - c^2} \sin \alpha_i$$

Current torque transmission rate as function of angle of output shaft rotation and gear parameters:

$$i_i = i_1 - i_2 = \frac{4ac}{a^2 - c^2} \sin \alpha_I$$

I ranging from 0 to 1.42 (Y=55°, α=90°) with $I_{average}$=0.892 (for gears only) and for Arov-engine in total=1.25 (counting direct torque effect factor which doubles engine efficiency compare to piston engine).

The increase of amount of chambers in each toroidal cylinder to four, and the combination of several combustion units using the common gear train provides a simple means for reducing output variations. It is also possible a combination of two combustion cylinders with a third compressor cylinder which is also in the form of an AROV pump to supply a compressed air charge to the engines and thus avoid the compression and suction strokes of the engine. In addition, this pump can also be used to assist in the exhaust of combustion products by effectively providing a vacuum source. The additional compressor can also be used merely to improve the compression cycle if this is so desired by providing precompression of the charge. With this arrangement, the four working chambers of each combustion cylinder can complete engine cycle in 360 degree rotation as opposed to 720 degrees.

With the present invention, it is possible position several combustion cylinders planetary to shaft 130 and to use a planetary gear train around shaft 130 stack the number of combustion cylinders to either side of the gear train and use a common drive train to effectively control the position of all vanes. This also assists in effectively transferring the power to the opposite engine as required for the particular cycle. In the case of a pump operation, the output gear is effectively the drive gear for the overall combination. With the present invention, it is economical to expand the output requirements merely by combining combustion units using the planetary gear train and stacking elements. This provides cost advantages as the same engine elements are effectively used and merely more engine units are provided and combined to improve the output when more power is required. Thus for a particular application, the appropriate engine power can be combined and if the demand changes in the future, additional units can often be added. Furthermore, it can be appreciated that efficiencies are also achieved in the manufacture of the engines in that the precise output requirements can be met by combining of the units as opposed to warehousing a whole series of engines having different output characteristics.

The present invention also discloses a unique valving arrangement to improve the supply and exhaust of working media to/from the working chambers.

Although various preferred embodiments of the present invention have been described herein in detail, it will be appreciated by those skilled in the art that variations may be made thereto without departing from the spirit of the invention or the scope of the appended claims.

The invention claimed is;

1. An engine or a pump comprising:
   at least one toroidal cylinder,
   two impellers with radial vanes rotatably mounted in said toroidal cylinder with said impellers cooperating with said toroidal cylinder to define working chambers between adjacent vanes,
   each of said impellers including to one side thereof at least one rotary valve element which rotates with each of said impellers and selectively opens and closes passages in a cylinder housing to said working chambers for in letting and exhausting a working media;
   said rotary valve elements cooperating with said cylinder housing such that the position of each of said rotary valve elements defines media flow through said engine or pump, and
   wherein each of said rotary valve elements includes two outwardly extending lobes that cooperate with a valve portion of said cylinder housing, said lobes closing ports in said cylinder housing to said working chambers as a function of the angular position of said valve elements.

2. The engine or pump as claimed in claim 1 including a drive train having at least two elliptical gears controlling said impellers and wherein each elliptical gear rotates around a focal point and where gear parameters are defined as function of minimum vane opening allowing formation of four chambers in each toroidal cylinder.

3. The engine or pump as claimed in claims 1 or 2 wherein each impeller has two diagonally opposed radial vanes which rotate within a toroidal cylinder of said housing with said four working chambers being defined between said vanes.

4. An engine or a pump comprising:
   at least one toroidal cylinder contained in a cylinder housing,
   two impellers rotatably mounted to the cylinder housing,
   each of said impellers having radial vanes rotatably mounted within said toroidal cylinder and a at least one rotary valve element mounted to the cylinder housing adjacent the toroidal cylinder,
   said impellers cooperating with said toroidal cylinder to define working chambers between adjacent vanes,
   said at least one rotary valve element rotating with each of said impellers and selectively opens and closes passages in said cylinder housing to said working chambers for inletting and exhausting a working media,
   said rotary valve elements cooperating with said cylinder housing such that the position of each of said rotary valve elements defines media flow through said engine or pump wherein each of said rotary valve elements includes two outwardly extending lobes that cooperate with a valve portion of said cylinder housing, and
   said lobes closing ports in said cylinder housing to said working chambers as a function of the angular position of said valve elements.

5. The engine or pump as claimed in claim 4 wherein each of said rotary valve elements has a series of arcuate passages which connect said working chambers with ports in said housing to selectively open and close ports in said housing to said working chambers, each arcuate media passage including a port adjacent a vane of said engine or pump.

* * * * *